United States Patent
Roth et al.

(10) Patent No.: US 9,404,238 B1
(45) Date of Patent: Aug. 2, 2016

(54) CONSTRUCTION MACHINE

(71) Applicant: BAUER MASCHINEN GmbH, Schrobenhausen (DE)

(72) Inventors: Stefan Roth, Petershausen (DE); Martin Lanzl, Ingolstadt (DE); Ralf Oehme, Ingolstadt (DE); Mathias Kohl, Strobenried (DE)

(73) Assignee: BAUER Maschinen GmbH, Schrobenhausen (DE)

( * ) Notice: Subject to any disclaimer, the term of this patent is extended or adjusted under 35 U.S.C. 154(b) by 0 days.

(21) Appl. No.: 14/594,115

(22) Filed: Jan. 10, 2015

(51) Int. Cl.
  *E02F 9/16* (2006.01)
  *E02F 9/08* (2006.01)
  *B60R 3/00* (2006.01)

(52) U.S. Cl.
  CPC ............... *E02F 9/0833* (2013.01); *B60R 3/005* (2013.01)

(58) Field of Classification Search
  CPC ...... B60P 3/025; B60P 3/0252; B60P 3/0257; B60P 3/14; B60P 3/34; B60R 3/005; B62D 33/06; B62D 33/0617; B66C 13/54; E02F 9/0833; E02F 9/163
  See application file for complete search history.

(56) References Cited

U.S. PATENT DOCUMENTS

| | | | | |
|---|---|---|---|---|
| 3,578,098 A * | 5/1971 | Clancy | ..................... | B60R 21/11 180/89.12 |
| 4,613,155 A * | 9/1986 | Greenwood | ......... | A01C 15/003 105/457 |
| 4,981,318 A * | 1/1991 | Doane | ..................... | B60P 3/14 296/182.1 |
| 5,285,604 A * | 2/1994 | Carlin | ..................... | B60P 3/14 52/143 |
| 6,209,682 B1 * | 4/2001 | Duffy | ..................... | B60R 3/00 182/127 |
| 6,357,773 B1 * | 3/2002 | Griebel | ..................... | B60R 3/02 280/166 |
| 6,817,433 B1 * | 11/2004 | Bergstrom | ............ | B62D 33/06 180/89.12 |
| 7,004,337 B2 * | 2/2006 | Lissandre | .............. | B66C 13/54 212/175 |
| 7,144,058 B1 * | 12/2006 | Winter | ..................... | B60P 3/34 296/162 |
| 8,002,336 B2 * | 8/2011 | Reeb | ..................... | B62D 25/10 296/193.07 |
| 2009/0084004 A1 * | 4/2009 | Kim | ..................... | E02F 9/00 37/466 |
| 2009/0250970 A1 * | 10/2009 | Regnell | ..................... | B60R 3/02 296/190.01 |
| 2012/0024629 A1 * | 2/2012 | Berry, Jr. | ................ | B60R 3/005 182/113 |
| 2012/0025507 A1 * | 2/2012 | Berry, Jr. | ................ | B60P 3/14 280/769 |
| 2012/0067660 A1 * | 3/2012 | Kashu | ..................... | B60K 13/04 180/296 |

(Continued)

FOREIGN PATENT DOCUMENTS

| | | | | |
|---|---|---|---|---|
| DE | 2400242 A1 * | 7/1975 | ............. | B60J 5/0498 |
| DE | 3205657 A1 * | 9/1983 | ............. | B60J 5/0498 |

(Continued)

OTHER PUBLICATIONS

The European search report issued by the European Patent Office on Dec. 2, 2013, which corresponds to European Patent Application No. 13177451 and is related to U.S. Appl. No. 14/594,115.

*Primary Examiner* — Glenn Dayoan
*Assistant Examiner* — Paul Chenevert
(74) *Attorney, Agent, or Firm* — Studebaker & Brackett PC

(57) ABSTRACT

A construction machine comprising an undercarriage designed as a running gear and an upper carriage with a housing having side walls, wherein for access to the housing at least one housing opening with an access wall is provided, which is adjustable into an open position, and in an area in front of the housing opening a horizontal gangway is formed. At least one pull-out element is provided which can be pulled out horizontally between a retracted position and a pulled out position, in which the pull-out element projects horizontally from the housing, and in order to form the gangway a base plate is provided on the pull-out element.

8 Claims, 5 Drawing Sheets

(56) References Cited

U.S. PATENT DOCUMENTS

Figure 1:
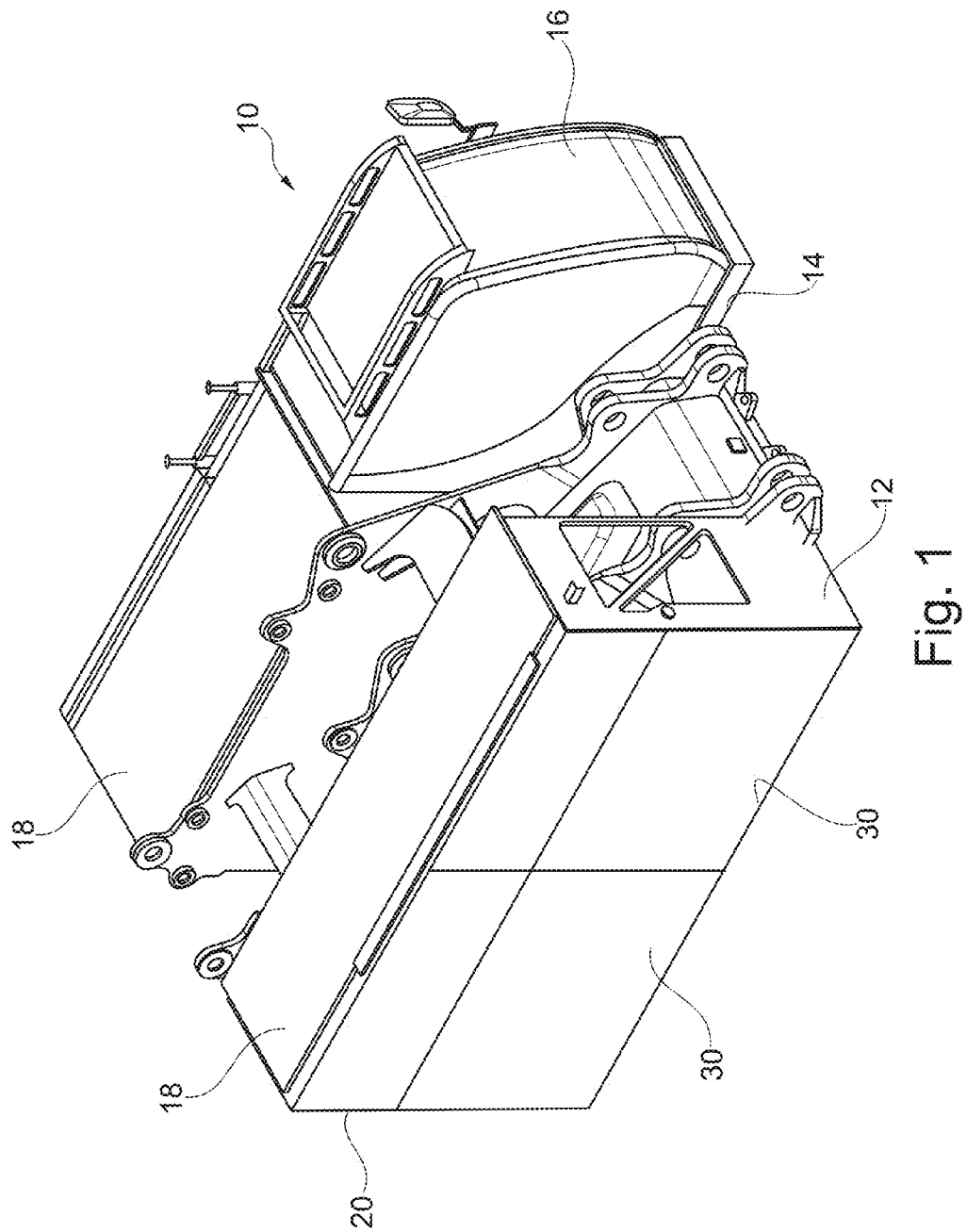

| | | | | |
|---|---|---|---|---|
| 2012/0153667 A1* | 6/2012 | Raber | ............... | B60P 3/34 296/162 |
| 2013/0140848 A1* | 6/2013 | Shanley | ............... | B60P 3/34 296/172 |
| 2014/0252785 A1* | 9/2014 | Kim | ............... | E02F 3/325 292/338 |
| 2015/0069781 A1* | 3/2015 | Wegkamp | ............... | B60P 3/34 296/171 |
| 2015/0291101 A1* | 10/2015 | Koshy | ............... | E02F 9/0833 280/727 |

FOREIGN PATENT DOCUMENTS

| | | | | |
|---|---|---|---|---|
| DE | 3446490 A1 * | 9/1985 | ............ | B60P 3/0257 |
| DE | 3916940 A1 * | 11/1990 | ............ | B60P 3/025 |
| DE | 9405207 U1 * | 5/1994 | ............ | B60P 3/0257 |
| DE | 10007031 A1 * | 11/2000 | ............ | B60P 3/0257 |
| DE | 10253542 A1 | 5/2004 | | |
| DE | 102009050189 A1 | 4/2011 | | |
| DE | 202013003459 U1 * | 7/2014 | ............ | B66C 13/52 |
| EP | 1449722 A1 * | 8/2004 | ............ | B60R 3/02 |
| EP | 2216238 A1 | 8/2010 | | |
| EP | 2299008 A1 | 3/2011 | | |
| EP | 2829663 A1 * | 1/2015 | ............ | B60R 3/00 |
| FR | 389868 A * | 9/1908 | ............ | B60P 3/025 |
| FR | 2423371 A1 * | 11/1979 | ............ | B60P 3/0257 |
| FR | 2745768 A1 * | 9/1997 | ............ | B60P 3/0252 |
| GB | 926289 A * | 5/1963 | ............ | B60R 3/005 |
| JP | H06-85148 U | 12/1994 | | |
| SU | 546555 A1 | 2/1977 | | |
| SU | 1532367 A1 * | 12/1989 | ............ | B60P 3/0257 |
| WO | WO 2005075280 A1 * | 8/2005 | ............ | B62D 25/02 |
| WO | WO 2007108729 A1 * | 9/2007 | ............ | B60P 3/34 |
| WO | 2010/037185 A1 | 4/2010 | | |

* cited by examiner

CONSTRUCTION MACHINE

BACKGROUND OF THE INVENTION (1) Field of the Invention

The invention relates to a construction machine comprising an undercarriage designed as a running gear an upper carriage with a housing having side walls, wherein for access to the housing at least one housing opening with an access wall is provided, which is adjustable by means of an adjustment mechanism into an open position, and in an area in front of the housing opening a horizontal gangway is formed.

(2) Description of the Related Art

Upper carriages of such type are deployed, for example, in earth drilling apparatuses or other earth working machines. These construction machines usually have a running gear, in particular a crawler-track running gear, as an undercarriage, on which an upper carriage is arranged in a fixed or rotatable manner. The upper carriage can therefore have a considerable distance to the ground surface. Depending on the size of the undercarriage this can usually amount to 1 to 2 meters [[m]] and more. As a rule, the drive units, such as a diesel engine, hydraulic pumps, a current generator or further drives for winches, are arranged in the upper carriage. Thus, for maintenance and repair purposes an easy and safe access to the housing of the upper carriage is required.

From DE 10 2009 050 189 A1 a construction machine with an upper carriage is known, in which parts of the housing can be folded open in the upward direction. A lateral gangway with fall protection device is arranged in a fixed manner along the flanks of the housing. However, such gangways arranged in a fixed manner either reduce the constructional space inside the housing or enlarge the external dimensions of the construction machine.

An upper carriage with a fold-out gangway can be taken from JP 6-85148 A1. The gangway is designed as a grating which is placed externally against a side wall. To set up the gangway supports have to be swung out and the grating must be folded downwards. An external grating has a negative effect on the appearance of the upper carriage and is, moreover, exposed to dirt and soiling without protection.

From SU 546555 A1 it is known a vehicle with wheels, at which a side wall can be displaced by displaceable rails which can be regarded as telescopic rails. After displacement and extension a vertical plate is placed into a horizontal position for forming a gangway.

A generic construction machine can be taken from EP 2 216 238 A1 for example. In this upper carriage vertical side walls can be moved vertically upwards by means of an adjustment mechanism. An internal protected gangway can then be folded downwards into a horizontal position in order to form a horizontal gangway. The gangway can only be formed after the access wall has been opened which can be a problem in terms of handling and for the safety of the operating personnel.

The invention is based on the construction machine to provide an upper carriage which, whilst being of a simple and compact construction, enables an easy and at the same time safe set-up of a gangway.

SUMMARY OF THE INVENTION

The construction machine according to the invention is characterized in that at least one pull-out element with a substantially vertical side wall element and a horizontal base plate is provided, which can be pulled out horizontally between a retracted position and a pulled out position, in which the pull-out element projects horizontally from the housing, and attached to at least two displaceable rails in the retracted position and the pull-out position for forming the gangway.

A basic idea of the invention resides in the fact that on at least one of the substantially vertical side walls provision is made for a pull-out element that is capable of being pulled out horizontally. In the retracted position the pull-out element is stored in a space-saving manner in or on the housing. Even in the case of large and heavy pull-out elements a horizontal pulling-out or retraction can be brought about with relatively small forces. This can be effected by a motor or manually. The pull-out element can be pulled out to such an extent that sufficient space is made available for a gangway for the operating personnel.

Basically, for horizontal displacement of the pull-out element any type of displacement mechanism can be provided. According to the invention an especially simple and robust arrangement is achieved in that at least two displaceable rails are designed as telescopic rails. By means of which the pull-out element is supported in such a manner that it can be pulled out. The two telescopic rails are provided in the lateral outer areas of the pull-out element so that it can be pulled out horizontally in a manner similar to a drawer. In the case of greater lengths of the pull-out element one or more telescopic rails can also be provided in a central area. By preference, a telescopic rail comprises a hollow rail fixed on the upper carriage, in which an inner rail is supported in an axially movable manner. The pull-out element is fixed on the movable inner rail.

A preferred embodiment of the invention resides in the fact that the side wall element forms at least a part of the access wall. In the horizontally pulled out open position this side wall element is still in a substantially vertical position and can thereby preferably form a railing or a part of the railing as a fall protection device on the gangway. By preference, the side wall element is disposed on the outside in the retracted or closed position and thus forms a part of the external access wall, hence the side wall of the housing. However, the side wall element can also be arranged on the inside and covered by an external removable or adjustable external wall element of the access wall.

Furthermore, an embodiment of the invention can be seen in the fact that the base plate is supported by or on the at least two telescopic rails. The telescopic rails are therefore designed as a supporting carrier or supporting frame for the base plate and hence the gangway. Further or additional support elements are not necessarily needed in this embodiment.

According to an embodiment of the invention it is preferred that the base plate is attached to the telescopic rails and can be moved out when the pull-out element is being drawn out. The base plate is arranged in a fixed manner on the telescopic rails, being in horizontal arrangement in or on the housing even in the closed position. By pulling out the pull-out element a ready-made gangway is thus formed, in which case a vertically disposed side wall element can serve as a railing for lateral fall protection.

According to a preferred embodiment of the invention, the at least one housing opening extends to the bottom of the housing forming a bottom opening, which is closed by the base plate in the retracted position and opened in the pull-out position. Thus the base plate forms part of the bottom of the housing. Along the edges of the base plate a sealing can be provided. In the pull-out position access to the interior of the housing, for example to an engine, is possible from the underside. This is useful to facilitate maintenance works. Further, a single housing opening can be formed which extends from the side wall to the bottom of the housing.

According to another embodiment of the invention a compact arrangement is achieved in that a part of the base plate is moveable and can be attached to the pull-out element after this has been drawn out. The base plate comprises a fixed part and the moveable part which can be stored as a separate piece in a different place and is only installed to create the gangway when the pull-out element has been pulled out. By preference, the moveable part of the base plate can be arranged in a folding manner on the fixed part or an interior of the side wall element for example. Hence, in the retracted position a part of the base plate can be directed vertically in a manner parallel to the side wall element. In the pulled out position the base plate can then be folded away from the side wall element into the horizontal position onto the telescopic rails. Alternatively, the base plate itself can also be designed as a telescopic plate.

The access wall can consist exclusively of the side wall element or be composed of several wall elements. The individual wall elements can be arranged side by side in succession so as to form a multi-layer access wall. By preference, in order to form the access wall provision is made above the side wall element for an upper wall element which, to enable its opening, is supported in a folding or displaceable manner. For example the upper wall element can be displaced or folded vertically upwards in order to form a railing element in the ceiling area.

According to a further embodiment of the invention, the base plate comprises an outer housing plate and an inner gangway plate. Furthermore, an insulation layer for reducing noise can be provided between the outer housing plate and the inner gangway plate.

According to an embodiment of the invention it is especially advantageous for the upper wall element to form a protective roof above the gangway in the open position.

For this purpose, the upper wall element can be hinged in a folding manner on its upper side to the ceiling area of the upper carriage and in this way moved upwards into an inclined or folded position where it is fixed by a locking mechanism. Hence, through the gangway with railing and the protective roof a working area that is particularly protected against all weather conditions can be formed when the housing is open. In this case, an adjustment mechanism for the access wall therefore comprises the pull-out element, which is capable of being pulled out, with the lower side wall part and a folding mechanism for the upper wall part.

To further enhance the operational safety it is of advantage in accordance with an embodiment of the invention that a mountable railing element is provided on the gangway and/or a ceiling area of the housing. The railing element can be provided on the side wall element for example in order to increase its height or provide additional safety where appropriate. The mountable railing element can also be provided at the front sides of the gangway. The mountable railing element can have a folding or pivot mechanism with bar-shaped elements or extendable barrier ropes or barrier chains. A railing element located in the ceiling area can provide additional protection for the working area formed.

If, when the access wall is open, the housing opening is not located directly adjacent to a driver's cab or an existent walking area of the upper carriage, provision can be made for one or several further pull-out elements. The pull-out element can be a simple movable base plate that is displaceable between a retracted position, in which the pull-out base is moved into the housing, and a pulled out position. In the pulled out position the pull-out base can be located adjacent to another gangway formed at the housing opening. Provision can also be made for mountable and, in particular, fold-out railing elements. As a matter of course, if a distance to the gangway is present, base plates can also be folded out or installed in a different way.

The invention comprises a construction machine having an upper carriage and an undercarriage which is designed as a running gear, wherein the construction machine is characterized in that the upper carriage is designed according to the aforedescribed invention. In particular, the construction machine is a construction machine for foundation engineering, especially an earth drilling apparatus, a vibrator or a pile driving device, as used in specialist foundation engineering in particular. The undercarriage is provided with crawler tracks.

In the following the invention will be described further by way of a preferred embodiment illustrated schematically in the accompanying drawings, wherein show:

BRIEF DESCRIPTION OF THE VIEWS OF DRAWINGS

Figure 2:
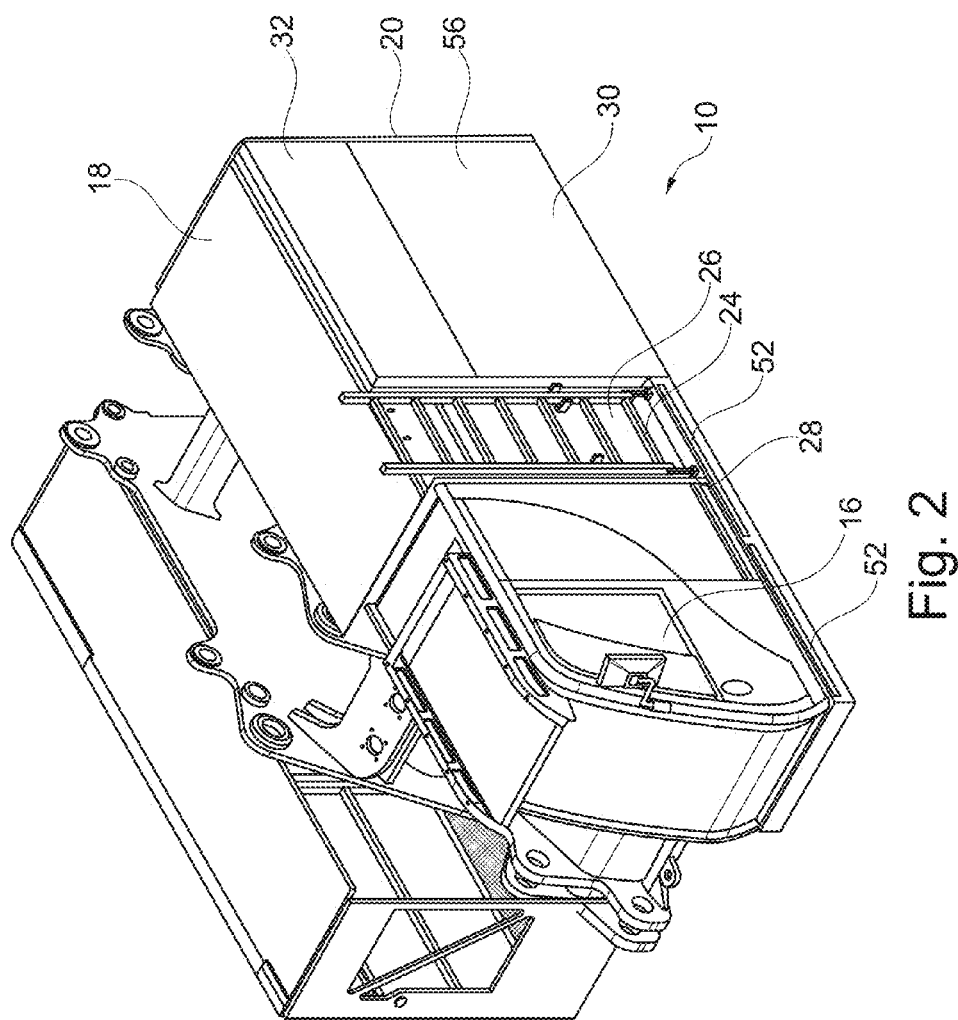
Figure 3:
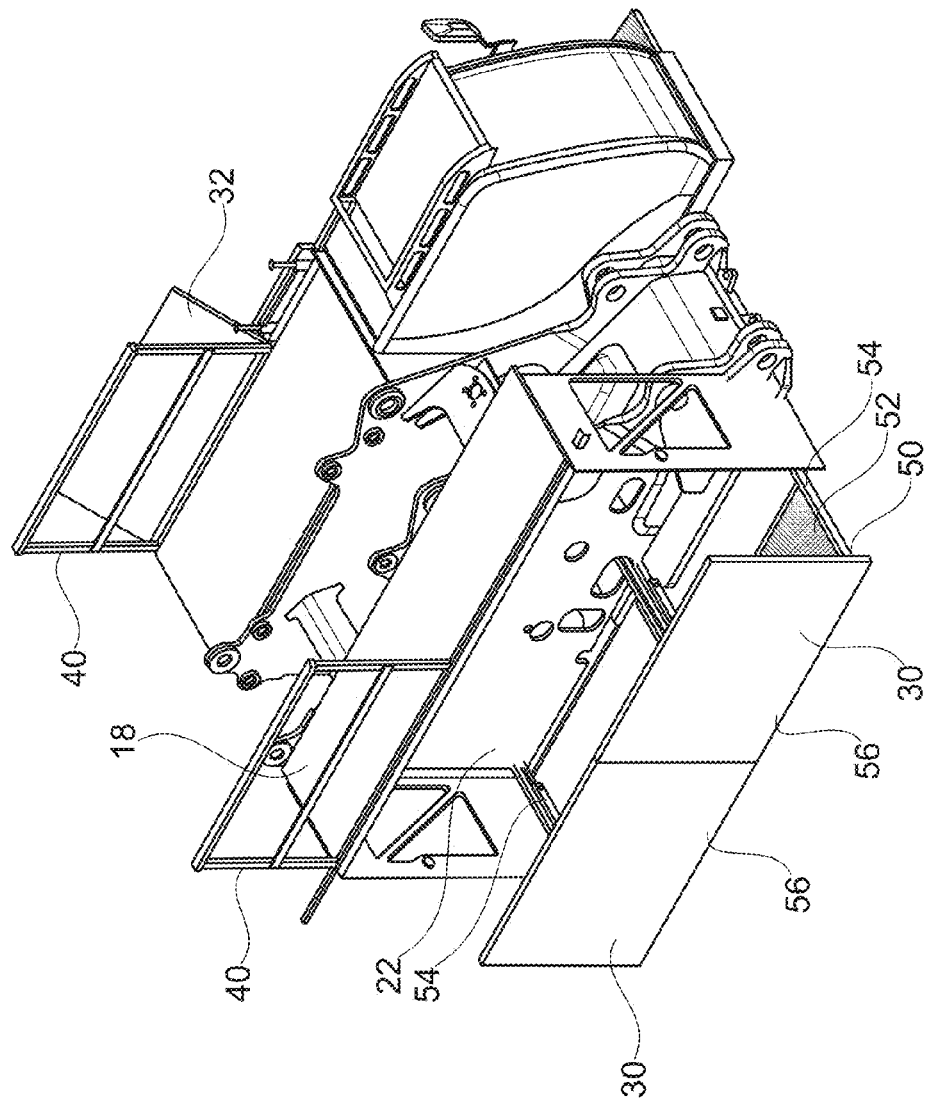
Figure 4:
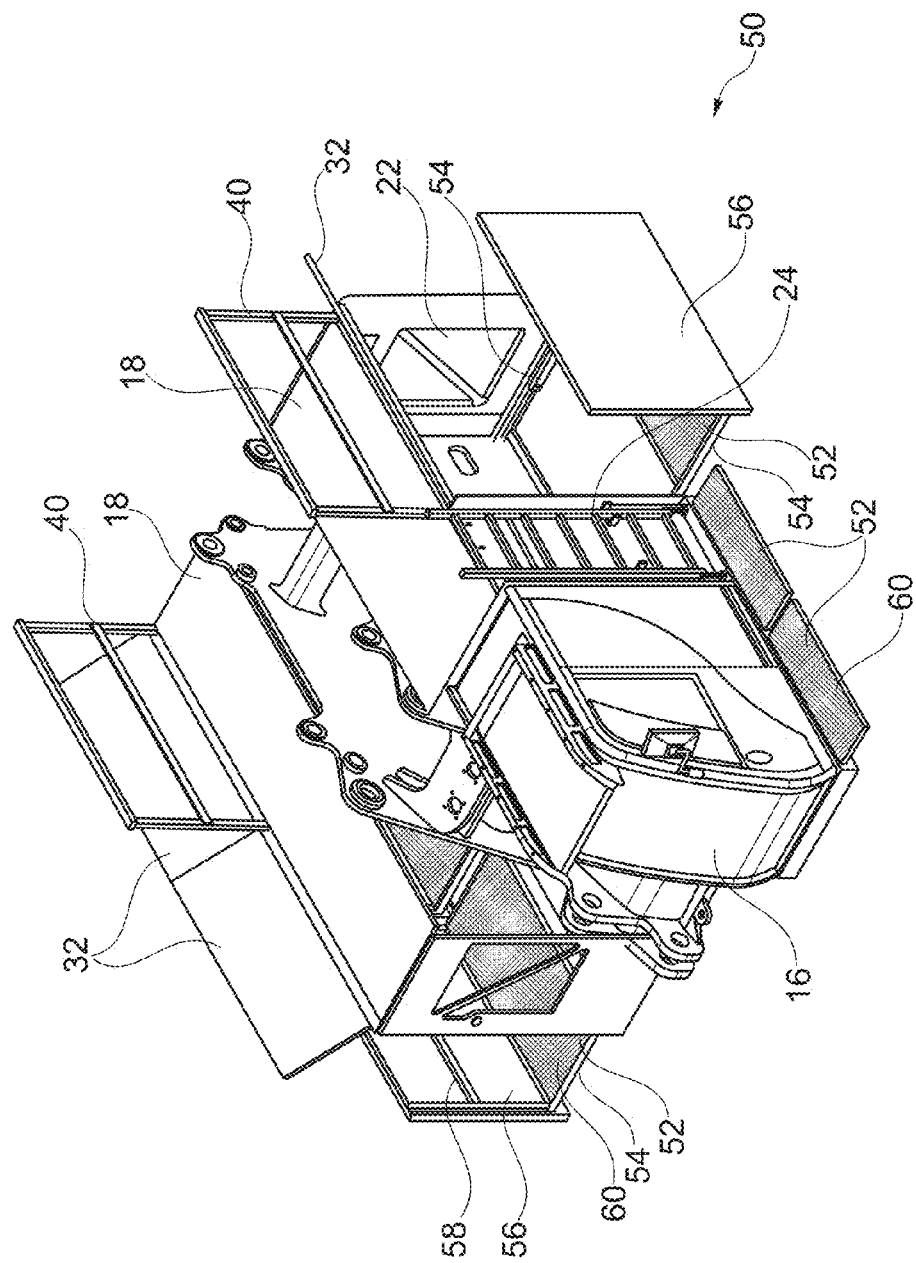
Figure 5:
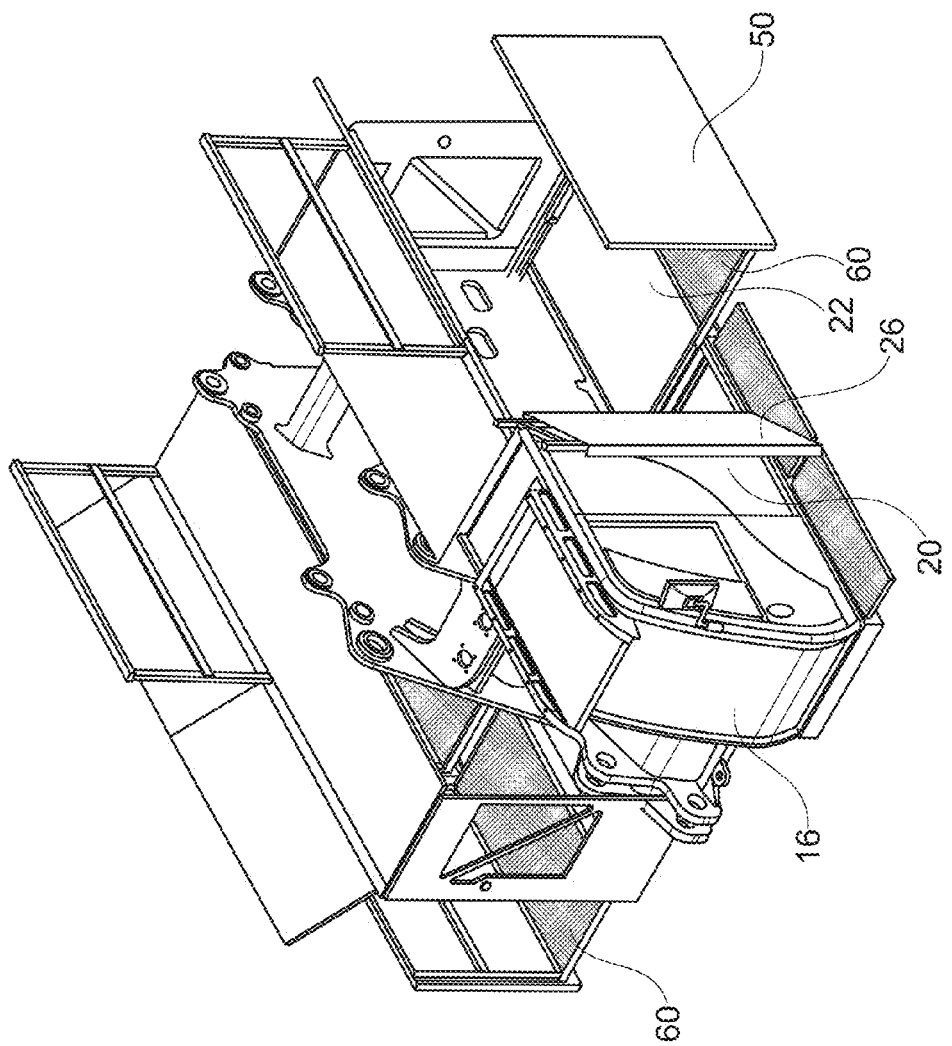

FIG. 1 a first perspective view of an upper carriage according to the invention with closed access walls;

FIG. 2 a further perspective view of the upper carriage according to FIG. 1 with closed access walls;

FIG. 3 a perspective view of the upper carriage according to FIG. 1 with open access walls;

FIG. 4 a perspective view of the upper carriage according to FIG. 2 with open access walls; and FIG. 5 the upper carriage according to the view of FIG. 4 with open door, in addition.

DETAILED DESCRIPTION OF THE INVENTION

In FIGS. 1 and 2 an upper carriage 10 for a construction machine according to the invention is shown in a closed state, i.e. with closed access walls 30. The upper carriage 10 comprises a box-like housing 12 which is supported by a basic frame 14. The box-like housing 12 comprises side walls 20 which are closed at the top by a ceiling area 18. The side walls 20 have access walls 30 which can be opened and are described in greater detail hereinafter.

At a front side of the upper carriage 10 a driver's cab 16 is arranged, as is known for various kinds of construction machines, especially earth drilling apparatuses.

For the sake of clarity, the illustrated upper carriage 10 is shown to a large extent without any attachments. In a central area of the housing 12 rope winches and a mast can be mounted. Inside the housing 12 different types of drive and control components can be accommodated, in particular a diesel drive, hydraulic pumps and a substantial part of the machine control unit.

The upper carriage 10 is attached to an undercarriage, in particular a crawler-track running gear. Due to the considerable size of such undercarriages on construction machines the external access to the housing 12 is not easily possible. The access walls 30 can be adjusted from a closed position shown in FIGS. 1 and 2 into an open position according to FIGS. 3 to 5. According to the invention pull-out elements 50 capable of being pulled out or displaced horizontally are provided. The pull-out elements 50 have a base plate 52 which, in the case of larger access walls 30, is provided by means of ball bearing-mounted telescopic rails 54 for horizontal movement. A horizontal movement can be effected manually or by a positioning mechanism that can have tension springs, a drive motor or a positioning cylinder.

By opening the access walls 30 and the base plate 52 a housing opening 22 is brought about on the housing 12. The housing opening 22 continuously extends from the side to the bottom of the housing 12. For safe access to the housing opening 22 the substantially vertical access walls 30 have a lower side wall element 56 which is arranged in a fixed manner on the telescopic rails 54. In the illustrated embodiment, a grating-like base plate 52 is in each case also arranged on the telescopic rails 54. In this embodiment, the opening of the housing 12 implemented through outward displacement of the side wall element 56 takes place at the same time as the base plate is moved out to form a gangway. The base plate 52 comprises a lower outer housing plate and an upper grid-like gangway plate.

An upper wall element 32 of the access wall 30 is pivotably supported in a ceiling area 18, enabling it to be pivoted upwards in order to enlarge the housing opening 22. The upper wall element 32 can preferably be fixed in an inclined position so that the upper wall element 32 forms a protective roof above the open working area on the housing 12. This is especially advantageous in bad weather conditions.

In the pulled out position the pulled out side wall element 56 forms a railing at the same time. As can be gathered from FIG. 4 in particular, a reinforcing frame 58 can be provided for this purpose on the interior of the side wall element 56.

As a further safety measure a fold-out or mountable railing element 40 can be set up in the ceiling area 18 above the housing opening 22. The railing element 40 ensures that persons, in particular, do not fall into the open working area.

In the area of the driver's cab 16 as well as in an area with a ladder 24 leading to the ceiling area 18 the pull-out element 50 can be designed as a simple base plate 52 that is capable of being pulled out. Through the base plates 52 thus located adjacent to each other a continuous gangway 60 can be formed. In the area of the ladder 24 a side wall 20 can be designed as a door element 26 which is pivotable by way of hinges 28 about a vertical pivot axis. On completion of the maintenance or operational works the pull-out elements 50 can be moved back without great effort by a motor or in a manual fashion from the pulled out position into the retracted position according to FIGS. 1 and 2. In this drawn-in retracted position, the base plates 52 are in particular protected against dirt or damage.

The invention claimed is:

1. Construction machine comprising an under carriage designed as a running gear and an upper carriage with a housing having side walls, wherein for access to the housing at least one housing opening with an access wall is provided, which is adjustable by an adjustment mechanism into an open position, and in an area in front of the housing opening a horizontal gangway is formed, wherein
the access wall, formed in a substantially vertical orientation, including a lower side wall element and an upper side wall element; at least one pull-out element with the lower side wall element of the access wall and a horizontal base plate is provided, which can be pulled out horizontally by at least two displaceable rails between a retracted position and a pulled out position, in which the pull-out element projects horizontally from the housing, the base plate is attached to the at least two displaceable rails in the retracted position and the pull-out position for forming the gangway, and the base plate forms a part of the housing in the retracted position and an access to the interior of the housing is enabled from an underside position when the base plate is in the pull-out position.

2. Construction machine according to claim 1,
wherein
at least two displaceable rails are designed as telescopic rails.

3. Construction machine according to claim 1,
wherein
the upper wall element is movable between a closed position and an open position.

4. Construction machine according to claim 1,
wherein
the at least one housing opening extends to the bottom of the housing forming a bottom opening, which is closed by the base plate in the retracted position and opened in the pull-out position.

5. Construction machine according to claim 1,
wherein
on the gangway or a ceiling area of the housing a mountable railing element is provided.

6. Construction machine according to claim 1,
wherein
on the housing several pull-out elements are provided.

7. Construction machine according to claim 1,
wherein
the upper wall element is supported in a folding or displaceable manner.

8. Construction machine according to claim 7,
wherein
in the open position a protective roof is formed above the gangway by the upper wall element.

* * * * *